June 25, 1957     J. R. HOLLINS     2,797,337
ELECTRICAL CONNECTION
Filed May 26, 1955
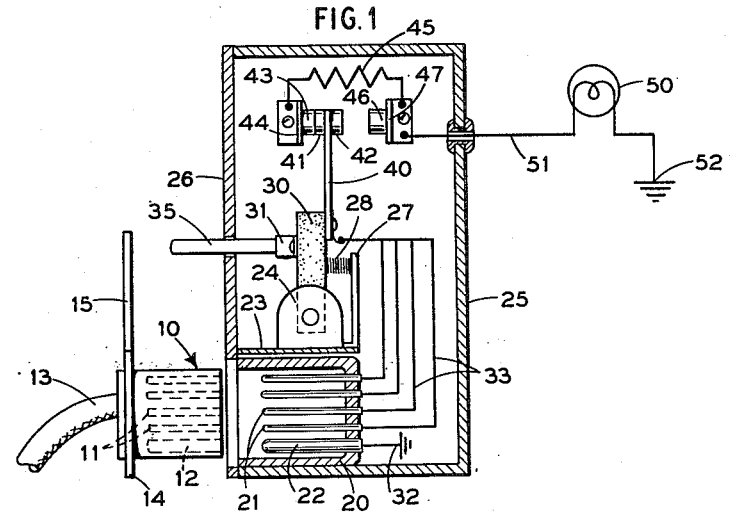
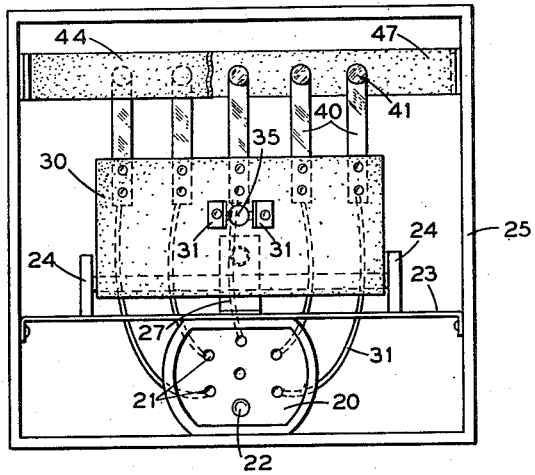
INVENTOR.
JESSE R. HOLLINS
ATTORNEY 2,797,337

ELECTRICAL CONNECTION

Jesse R. Hollins, Brooklyn, N. Y.

Application May 26, 1955, Serial No. 511,375

6 Claims. (Cl. 307—10)

This invention relates to electrical connectors for interconnecting the electrical systems of automotive tractors and trailers and, more particularly, to a connector of this type automatically compensating for differences in the voltage of the two systems.

Automotive tractors, as used in the trucking industry, may have 6-volt or 12-volt battery-generator electrical systems. When such a tractor is hitched to an automotive trailer, the electrical systems of the tractor and trailer must be interconnected so that electrical devices such as lamps, etc. on the trailer can be supplied with power from the tractor and their operation controlled from the tractor. This interconnection is made by means of multiple contact mating plugs, one on the tractor and one on the trailer.

The tractor plug is usually a female plug or receptacle having pin receiving sockets connected to individual circuits on the tractor, the conductors being bound into a cable. The trailer usually carries a male plug having pins respectively connected to the individual circuits on the trailer. To assure proper interconnection of each trailer circuit to its corresponding circuit on the tractor, indexing means are provided on the plug and receptacle. This indexing means may comprise an out-size pin on the plug engageable in an outsize socket in the receptacle, or the indexing means may comprise uniquely interfitting parts on the plug and receptacle.

Trailers in use today are equipped with either 6-volt or 12-volt electrical systems. Consequently, they are useable only with tractors having electrical systems that match the voltage of the tractor. This creates a problem when the tractor hauling the trailer is changed for another tractor, as frequently occurs when a trucking line has reached the limit of its scheduled service area. Also, tractors are changed, for example, when the trailer is to be hauled over mountainous territory, tractors particularly adapted for such territory being substituted for those designed for economical haulage over more level terrain.

This problem arises, for example, if the initial tractor has a 6-volt electrical system and the receiving tractor a 12-volt system, or vice versa. If the trailer has a 6-volt system, it cannot operate safely or efficiently, on a 12-volt system, as the trailer lamps will rapidly be burnt out. Conversely, if the trailer has a 12-volt system, a 6-volt supply is insufficient to properly illuminate the trailer lamps.

For the foregoing reasons, the present invention is directed to a novel tractor-trailer electrical connector having provision for automatically introducing resistance into series in the 6-volt electrical system of a trailer when the latter is connected to a tractor having a 12-volt supply system, and for automatically cutting out such resistance when the trailer is connected to a tractor having a 6-volt supply system. Thus, the trailer circuits are automatically supplied with power at the correct voltage irrespective of the supply voltage of the tractor.

For an understanding of the invention principle, reference is made to the following description of a typical embodiment thereof as illustrated in the accompanying drawing. In the drawing:

Fig. 1 is a somewhat schematic side elevation view, partly in section, of an electrical connector embodying the invention;

Fig. 2 is a partial rear elevation view of the male plug on the trailer;

Fig. 3 is a rear elevation view of the female receptacle on a tractor having a 6-volt supply system; and Fig. 4 is a similar view of the receptacle on a tractor having a 12-volt supply system.

Referring to Figs. 1 and 2, the invention connector comprises a female receptacle 10 on the tractor having mating engagement with a male plug 20 on the trailer. Receptacle 10 comprises a dielectric body having conductive pin sockets 11 and 12, socket 12 being larger than socket 11 for indexing purposes. Wires connected to sockets 11 and 12 are grouped into a cable 13 extending from receptacle 10 and are branched off at suitable points for connection to the several circuits of the tractor such as, for example, the tail lamps circuit, side lamps circuit, stop lamps circuit and directional signaling lamps circuit.

For a purpose to be described, a collar 14 is clamped around receptacle 10 and has a projecting flat abutment arm 15.

Plug 20 may be mounted in a suitable housing 25 on the trailer, this housing having a removable outer cover or wall 26. The plug is provided with conductive pins 21 and 22, the pin 22 is larger than pins 21 and is utilized essentially for indexing engagement in socket 12 of receptacle 10 while pins 21 engage in sockets 11; pin 22 being electrically grounded as at 32. Such indexing of receptacle 10 and plug 20 is important to assure interconnection of corresponding circuits on the tractor and trailer.

A shelf 23 extends across housing 25 just above plug 20 and carries spaced bearings 24 pivotally supporting a dielectric plate or bar 30. Shelf 23 has an arm 27 extending upwardly, and a spring 28 engaged between this arm and bar 30 biases the bar counterclockwise as viewed in Fig. 1. Bearings 31 on the outer surface of bar 30 pivotally support a pin 35 which projects outwardly through a suitable aperture in cover 26.

Bar 30 carries a plurality of spring contact fingers 40 each having contacts 41 and 42 on its free end, the number of fingers 40 corresponding to the number of lamps of the trailer and each pin 21 being electrically connected to a different finger 40 by a conductor 33.

Under the biasing influence of spring 28, contact fingers 40 are urged counterclockwise to engage contacts 41 with contacts 43 mounted on a dielectric bar or plate 44 supported in housing 25. When fingers 40 are moved clockwise by inward pressure on pin 35, contacts 42 on fingers 40 engage contacts 46 on a dielectric bar or plate 47 mounted in housing 25.

Each contact 46 is electrically connected to a different lamp circuit of the trailer, a typical circuit being illustrated as including a conductor 51 connected to a contact 46 and extending through an aperture in housing 25 to a 6-volt lamp 50 grounded at 52.

In accordance with the invention, a fixed resistor 45 is connected between each fixed contact 43 and its associated fixed contact 44, each resistance being of such value that, when in series in its associated trailer circuit with 12 volts applied to contact 43, the voltage at contact 46 will be 6 volts.

As shown in Fig. 3, the receptacles 10 on tractors having a 6-volt system have collar 14 clamped thereto. Consequently, when such a receptacle 10 is engaged with plug 20, arm 15 will strike pin 35 and push it in to swing bar 30 and fingers 40 clockwise. This disengages contacts 41 from contacts 43 and engages contacts 42 with contacts 46, shunting resistances 45 and connecting each pin 21 or 22 directly to its associated contact 46. The trailer circuits are thus supplied with power at 6-volts.

As shown in Fig. 4, the collar is omitted from receptacles 10' on tractors having a 12-volt system. Thus, when receptacle 10' is engaged with plug 20, pin 35 is not depressed and the parts have the position of Fig. 1. A resistance 45 is thus connected in series in each trailer circuit, reducing the 12-volt supply to a 6-volt potential applied to each trailer circuit.

Although in the embodiment illustrated in the drawing, each specified one of the pins 21 is connected by a specific one of the conductors 40 and its specific associated contacts 41—42 to a specific one of the lamps 50; it is within the province of this invention to provide a series of conductors 40 leading from each specific pin 21 with each single conductor 40 of such series of conductors being respectively connectible by its contacts 41—42 to engage specific contacts 43 or 46 of each individual limit circuit to thereby insert in circuit or shunt out the individual resistances 45 selectively connectible in such individual lamp circuits.

Although in the embodiment illustrated in the drawing, fixed resistances 45 have been provided for insertion in or shunting out of each individual lamp circuit, it is within the province of this invention to utilize lamps per se of corresponding value as resistances 45.

While a specific embodiment of the invention has been shown and described in detail to illustrate the application of the invention principle, it will be understood that the invention may be embodied otherwise without departing from such principle.

What is claimed is:

1. Means for connecting an electrical load system designal for operation at a first preset voltage to either of a pair of electrical supply systems, one operating at said first voltage and the other operating at a second preset voltage differing substantially from said first voltage, said means comprising, in combination, a connector having first contact means connectable with said load system, second contact means, and a first connector plug in circuit connection with said second contact means; second plugs each in circuit connection with a different one of said supply systems and each interfitting complementarily with said first connector plug; impedance means connected in series between said first contact means and said second contact means; switch means effective when operated, to shunt said impedance means by connecting said first plug directly to said first contact means; and means on the second plug of the supply system operating at the lower voltage operable to engage and operate said switch means to shunting position responsive to interfitting of the first and second plugs; said switch means remaining in the non-operated position when the second plug of the supply system operating at the higher voltage is interfitted with said first plug.

2. Connector means as claimed in claim 1 including plural contacts forming part of said contact means and plural impedances each connected in series between a different pair of first and second contacts; and plural switch means each effective, when operated, to shunt a different impedance, said switches being ganged for unit operation.

3. Connector means as claimed in claim 2 in which said first plug comprises a male connector having pins each connected to a second contact; and said second plugs comprise female receptacles having sockets each receiving one of said pins.

4. Means for connecting an electrical load system designed for operation at a first preset voltage to either of a pair of electrical supply systems, one operating at said first voltage and the other operating at a second preset voltage differing substantially from said first voltage, said means comprising, in combination, a connector having first contact means connectable with said load system, second contact means and a first connector plug in circuit connection with said second contact means; second plugs each in circuit connection with a different one of said supply systems and each interfitting complementarily with said first plug; said first and second plugs having at least one pair of mating circuit completing contacts engaged by interfitting of a second plug with said first connector; a single pole double throw switch having a movable arm connected to the circuit completing contact of said first plug and including said first and second contact means engageable by said arm; an impedance connected between said switch contact means; means biasing said arm to engage said second contact means to connect said impedance in series between said first and second contact means; and means on the second plug of the supply system operating at the lower voltage operable to engage said arm and move it to engage said first contact means responsive to interfitting of the first and second plugs; said arm remaining engaged with said second contact means when the second plug of the supply system operating at the higher voltage is interfitted with said first plug.

5. Connector means as claimed in claim 4 including a projecting pin on said switch arm engaged by an abutment on the second plug of the supply system operating at the lower voltage.

6. Connector means as claimed in claim 5 in which said abutment is carried by a collar detachably secured to said second plug.

References Cited in the file of this patent

UNITED STATES PATENTS 2,693,539    Madigan  ---------------  Nov. 2, 1954